(12) United States Patent
Kawakami

(10) Patent No.: US 12,664,825 B2
(45) Date of Patent: Jun. 23, 2026

(54) PROCESSING APPARATUS AND METHOD FOR PERFORMING PERSONAL AUTHENTICATION USING CAMERA IMAGE, COLLATING COLLATION INFORMATION WITH REFERENCE PERSON INFORMATION, AND NON-TRANSITORY STORAGE MEDIUM

(71) Applicant: NEC Corporation, Tokyo (JP)

(72) Inventor: Kazuya Kawakami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 272 days.

(21) Appl. No.: 18/520,879

(22) Filed: Nov. 28, 2023

(65) Prior Publication Data

US 2024/0185640 A1 Jun. 6, 2024

(30) Foreign Application Priority Data

Dec. 2, 2022 (JP) ................................. 2022-193345

(51) Int. Cl.
| | |
|---|---|
| *G06V 40/50* | (2022.01) |
| *G06V 10/74* | (2022.01) |
| *G06V 20/64* | (2022.01) |
| *G06V 40/10* | (2022.01) |
| *G06V 40/16* | (2022.01) |
| *G06V 40/20* | (2022.01) |
| *G06V 10/75* | (2022.01) |
| *G06V 40/18* | (2022.01) |

(52) U.S. Cl.
CPC .............. *G06V 40/53* (2022.01); *G06V 10/74* (2022.01); *G06V 20/64* (2022.01); *G06V*

*40/103* (2022.01); *G06V 40/172* (2022.01); *G06V 40/25* (2022.01); *G06V 10/75* (2022.01); *G06V 40/197* (2022.01)

(58) Field of Classification Search
None
See application file for complete search history.

(56) References Cited

U.S. PATENT DOCUMENTS

| | | | |
|---|---|---|---|
| 10,735,959 B2 * | 8/2020 | LeCun ................... | H04N 19/46 |
| 2013/0322708 A1 * | 12/2013 | Heringslack ........... | G06V 40/16 |
| | | | 382/118 |

(Continued)

FOREIGN PATENT DOCUMENTS

| | | |
|---|---|---|
| JP | 2020-178167 A | 10/2020 |
| JP | 2022-063425 A | 4/2022 |

(Continued)

*Primary Examiner* — Haris Sabah
(74) *Attorney, Agent, or Firm* — Sughrue Mion, PLLC

(57) ABSTRACT

To perform personal authentication using an image without registering a camera image, the present invention provides a processing apparatus 10 including: an acquisition unit 11 that acquires collation information including a camera image being an image of a collation-target person generated by a camera, or an image being restored from the camera image and representing a three-dimensional shape of a person; a collation unit 12 that collates the collation information with reference person information including an image being restored from a camera image and representing a three-dimensional shape of each of a plurality of reference persons; and an output unit 13 that executes processing depending on a result of the collation.

19 Claims, 8 Drawing Sheets

(56) References Cited

U.S. PATENT DOCUMENTS

| | | | | |
|---|---|---|---|---|
| 2016/0202047 A1 * | 7/2016 | Aoki | ........................ | G06T 7/507 |
| | | | | 356/612 |
| 2016/0335472 A1 * | 11/2016 | Lee | ......................... | G06T 7/521 |
| 2020/0211184 A1 * | 7/2020 | Fukuda | ................... | G06F 18/22 |

FOREIGN PATENT DOCUMENTS

| | | | |
|---|---|---|---|
| WO | 2020/136795 | A1 | 7/2020 |
| WO | 2021/152736 | | 8/2021 |
| WO | 2021/230123 | A1 | 11/2021 |

* cited by examiner

ACQUISITION UNIT

12

COLLATION UNIT

13

OUTPUT UNIT

PROCESSING APPARATUS

INPUT/
OUTPUT I/F — 3A

5A

PROCESSOR          MEMORY          PERIPHERAL
CIRCUIT 1A          2A          4A

FIG. 5

REFERENCE PERSON INFORMATION

| REFERENCE PERSON IDENTIFICATION INFORMATION | THREE-DIMENSIONAL SHAPE IMAGE | GAIT | PHYSIQUE | · · · |
|---|---|---|---|---|
| R007829 | · · · · · · .jpg | * * * | * * * | · · · |
| · · · · | · · · · | · · · · | · · · · | · · · · |

1

PROCESSING APPARATUS AND METHOD FOR PERFORMING PERSONAL AUTHENTICATION USING CAMERA IMAGE, COLLATING COLLATION INFORMATION WITH REFERENCE PERSON INFORMATION, AND NON-TRANSITORY STORAGE MEDIUM

This application is based upon and claims the benefit of priority from Japanese patent application No. 2022-193345, filed on Dec. 2, 2022, the disclosure of which is incorporated herein in its entirety by reference.

TECHNICAL FIELD

The present invention relates to a processing apparatus, a processing system, a processing method, and a program.

BACKGROUND ART

Patent Documents 1 to 5 disclose techniques related to the present invention.

According to the technique disclosed in Patent Document 1 (International Patent Publication No. WO2020/136795), when face authentication cannot be performed, a person captured in an image is determined by using different information. The different information includes a body shape, a height, a shoulder width, a ratio between body parts, clothes, a hairstyle, an accessory, belongings, and/or the like.

According to the technique disclosed in Patent Document 2 (International Patent Publication No. WO2021/230123), a person registered in a blacklist is detected by authentication processing that uses biometric authentication information. The biometric authentication information includes a feature value of at least one of a face, an iris, a vein, an auricle, a fingerprint, a voiceprint, a gait, and a body shape.

According to the technique disclosed in Patent Document 3 (Japanese Patent Application Publication No. 2022-63425), a target person is detected by using appearance attribute authentication processing and gait authentication processing. The technique uses a feature such as a face, an auricle, a costume, shoes, a hat, a height, and belongings in the appearance attribute authentication processing. In addition, the technique uses a stride length, walking velocity, a motion feature, and/or the like in the gait authentication processing.

According to the technique disclosed in Patent Document 4 (International Patent Publication No. WO2021/152736), a person registered in a list is detected by using a feature value of a face, an iris, a vein, an auricle, a fingerprint, a gait, a body shape, and/or the like. Persons registered in the list include a wanted person, a person related to an anti-social force, an ex-convict, a stalker, and the like.

According to the technique disclosed in Patent Document 5 (Japanese Patent Application Publication No. 2020-178167), an entire-body image and a face image that represent an appearance feature of a suspect in an incident or the like are extracted with high accuracy, and thereby the suspect is tracked. The technique extracts a feature of an entire body, a face, gender, age, a body shape, a costume, belongings, an accessory, a walking style, and/or the like of a person.

DISCLOSURE OF THE INVENTION

None of Patent Documents 1 to 5 describes and suggests a personal-authentication problem caused by a privacy issue, and a solution thereto.

In view of the above-described issue, one example of an object of the present invention is to provide a processing apparatus, a processing system, a processing method, and a program that solve a problem of performing personal authentication using an image, without registering a camera image.

According to one aspect of the present invention, there is provided a processing apparatus including:

an acquisition unit that acquires collation information including a camera image being an image of a collation-target person generated by a camera, or an image being restored from the camera image and representing a three-dimensional shape of a person;

a collation unit that collates the collation information with reference person information including an image being restored from a camera image and representing a three-dimensional shape of each of a plurality of reference persons; and an output unit that executes processing depending on a result of the collation.

Further, according to one aspect of the present invention, there is provided a processing system including:

a processing apparatus includes an acquisition unit that acquires collation information including a camera image being an image of a collation-target person generated by a camera, or an image being restored from the camera image and representing a three-dimensional shape of a person, a collation unit that collates the collation information with reference person information including an image being restored from a camera image and representing a three-dimensional shape of each of a plurality of reference persons, and an output unit that outputs the reference person information matching the collation information; and a terminal apparatus includes a transmission/reception unit that transmits the collation information to the processing apparatus, and receives, from the processing apparatus, the reference person information matching the collation information, and a terminal output unit that outputs the received reference person information.

Further, according to one aspect of the present invention, there is provided a processing method including, by at least one computer:

acquiring collation information including a camera image being an image of a collation-target person generated by a camera, or an image being restored from the camera image and representing a three-dimensional shape of a person;

collating the collation information with reference person information including an image being restored from a camera image and representing a three-dimensional shape of each of a plurality of reference persons; and executing processing depending on a result of the collation.

Further, according to one aspect of the present invention, there is provided a program causing a computer to function as:

an acquisition unit that acquires collation information including a camera image being an image of a collation-target person generated by a camera, or an image being restored from the camera image and representing a three-dimensional shape of a person;

a collation unit that collates the collation information with reference person information including an image being restored from a camera image and representing a three-dimensional shape of each of a plurality of reference persons; and an output unit that executes processing depending on a result of the collation.

According to one aspect of the present invention, a processing apparatus, a processing system, a processing method, and a program that solve a problem of performing personal authentication using an image without registering a camera image can be achieved.

BRIEF DESCRIPTION OF THE DRAWINGS

The above-described object, other objects, features, and advantages will become more apparent from the following preferred example embodiments and the following drawings associated therewith.

FIG. 1 is a diagram illustrating one example of a functional block diagram of a processing apparatus.

FIG. 2 is a diagram illustrating one example of a hardware configuration of the processing apparatus.

FIG. 5 is a diagram schematically illustrating one example of information processed by the processing apparatus.

DESCRIPTION OF EMBODIMENTS

Figure 3:
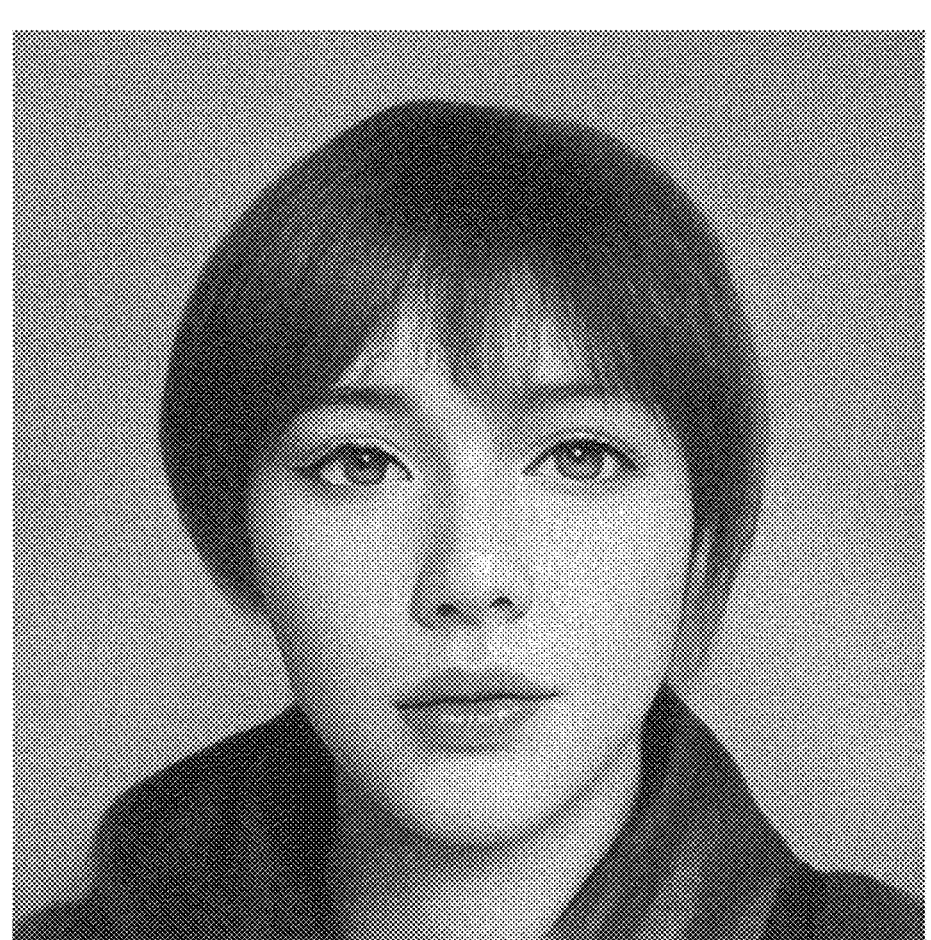
FIG. 3 is a diagram illustrating one example of a three-dimensional shape image.

Hereinafter, example embodiments of the present invention will be described with reference to the drawings. Note that, a similar constituent element is denoted by a similar reference sign in all the drawings, and description thereof will be appropriately omitted.

First Example Embodiment

Figure 1:
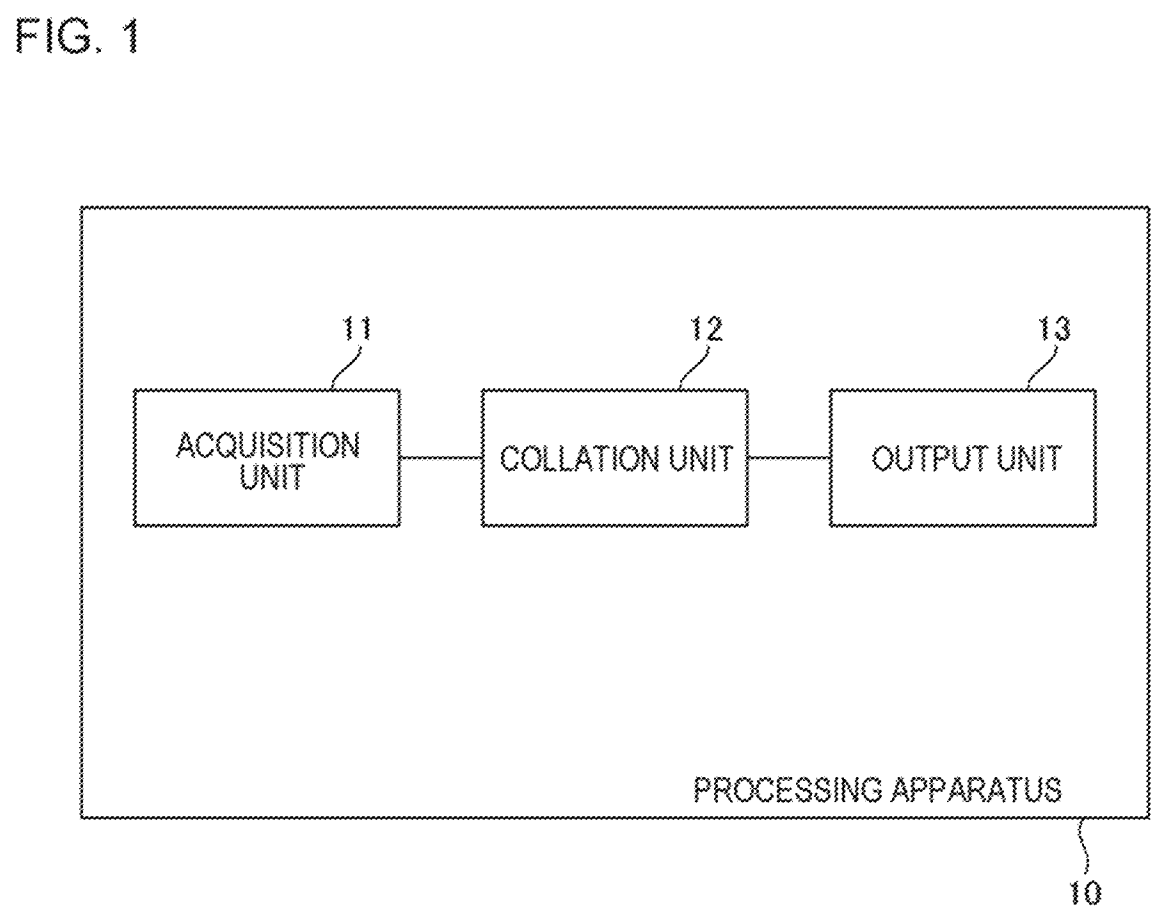

FIG. 1 is a functional block diagram illustrating an outline of a processing apparatus 10 according to a first example embodiment. The processing apparatus 10 includes an acquisition unit 11, a collation unit 12, and an output unit 13.

The acquisition unit 11 acquires collation information including a camera image being an image of a collation-target person generated by a camera, or an image being restored from the camera image and representing a three-dimensional shape of the person. The collation information is information acquired at timing of personal authentication when the personal authentication is performed, and is not information registered in advance in a database.

The collation unit 12 collates the collation information acquired by the acquisition unit 11, with reference person information including an image being restored from a camera image and representing a three-dimensional shape of each of a plurality of reference persons. The reference person information is information registered in advance in the database, for personal authentication. In the present example embodiment, an image used as the reference person information is not a camera image, but is an image being restored from a camera image and representing a three-dimensional shape of a person.

The output unit 13 executes processing depending on a result of the collation.

As described above, according to the present example embodiment, an image being restored from a camera image and representing a three-dimensional shape of a person is registered as the reference person information in the database, instead of a camera image. Then, the processing apparatus 10 collates such reference person information with the collation information concerning a collation-target person, and thereby performs personal authentication. In the processing apparatus 10 having such a configuration, a camera image representing an appearance (face and/or entire body) of a person does not need to be registered in the database. According to such processing apparatus 10 of the present example embodiment, a problem of performing personal authentication using an image without registering a camera image is solved.

Second Example Embodiment

"Outline"

The processing apparatus 10 according to the present example embodiment is an embodied one of the processing apparatus 10 according to the first example embodiment.

A feature of the processing apparatus 10 according to the present example embodiment lies in that an image used as reference person information registered in advance in a database for personal authentication is not a camera image of a person generated by a camera, but is an image being restored from a camera image and representing a three-dimensional shape of a person. Hereinafter, an image being restored from a camera image and representing a three-dimensional shape of a person is referred to as a "three-dimensional shape image".

A three-dimensional shape image represents a three-dimensional shape of a person. In other words, the three-dimensional shape image represents a feature of an appearance of a person, similarly to a camera image. Using such a three-dimensional shape image enables personal authentication to be performed by processing similar to that in a case of using a camera image.

In addition, the three-dimensional shape image is an "image designed by a computer" being restored from a camera image, and is not a camera image. Even when registration of a camera image is not permitted without permission of a person because of a privacy issue, there is a case in which registration of the three-dimensional shape image is permitted without permission of the person. Using the three-dimensional shape image as the reference person information can solve a personal-authentication problem of "a camera image cannot be registered without permission of the person".

Hereinafter, a configuration of such a processing apparatus 10 will be described in detail.

"Hardware Configuration"

Next, one example of a hardware configuration of the processing apparatus 10 will be described. Each function unit of the processing apparatus 10 is achieved by any combination of hardware and software. It is understood by those skilled in the art that there are various modifications for an achieving method thereof. Examples of the software include a program stored in advance at a stage of shipping an apparatus, a program downloaded from a storage medium such as a compact disc (CD), a server on the Internet, or the like, and the like.

Figure 2:
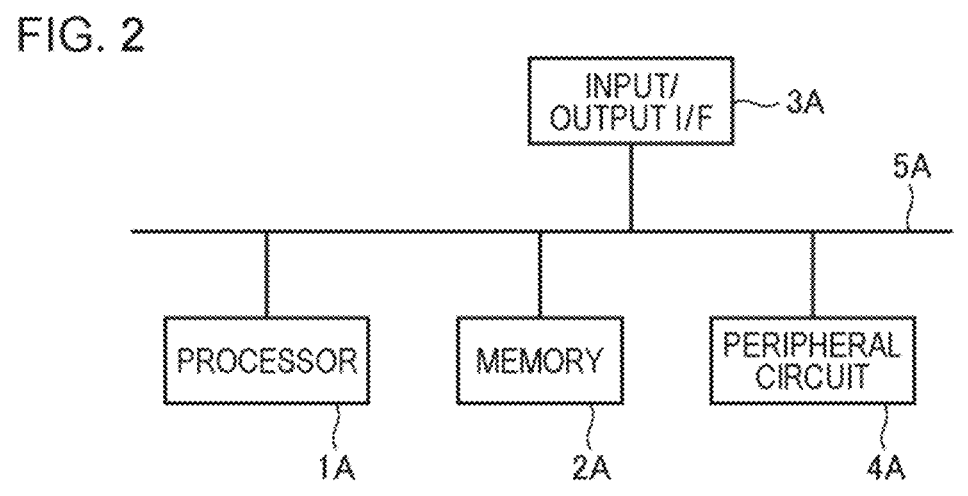

FIG. 2 is a block diagram illustrating the hardware configuration of the processing apparatus 10. As illustrated in FIG. 2, the processing apparatus 10 includes a processor 1A, a memory 2A, an input/output interface 3A, a peripheral circuit 4A, and a bus 5A. The peripheral circuit 4A includes various modules. The processing apparatus 10 does not need to include the peripheral circuit 4A. Note that, the processing apparatus 10 may be constituted of a plurality of physically and/or logically separated apparatuses. In this case, each of a plurality of the apparatuses can include the above-described hardware configuration.

The bus 5A is a data transmission path for the processor 1A, the memory 2A, the peripheral circuit 4A, and the input/output interface 3A to mutually transmit and receive data. The processor 1A is, for example, an arithmetic processing apparatus such as a central processing unit (CPU) or a graphics processing unit (GPU). The memory 2A is, for example, a memory such as a random access memory (RAM) or a read only memory (ROM). The input/output interface 3A includes an interface for acquiring information from an input apparatus, an external apparatus, an external server, an external sensor, a camera, and/or the like, an interface for outputting information to an output apparatus, an external apparatus, an external server, and/or the like, and/or the like. In addition, the input/output interface 3A can include an interface for connecting to a communication network such as the Internet. The input apparatus includes, for example, a keyboard, a mouse, a microphone, a physical button, a touch panel, and/or the like. The output apparatus includes, for example, a display, a speaker, a printer, a mailer, and/or the like. The processor 1A can output a command to each module, and based on results of arithmetic operation thereof, the processor 1A can perform arithmetic operation.

"Functional Configuration"

Next, a functional configuration of the processing apparatus 10 according to the present example embodiment will be described in detail. FIG. 1 illustrates one example of a functional block diagram of the processing apparatus 10. As illustrated in the drawing, the processing apparatus 10 includes an acquisition unit 11, a collation unit 12, and an output unit 13.

The acquisition unit 11 acquires collation information concerning a collation-target person.

The "collation-target person" refers to a target person for which personal authentication is to be performed. In some cases, a person voluntarily becomes a collation-target person, and in other cases, a person becomes a collation-target person without his or her intention.

The cases in which a person voluntarily becomes a collation-target person include a case in which a person proves that he or she has legitimate authority, or the like. For example, in order to prove that a user has legitimate authority such as login authority or entrance authority, the user voluntarily becomes a collation-target person, and is subjected to personal authentication.

The cases in which a person becomes a collation-target person without his or her intention include a case in which a person registered in a blacklist or a whitelist is detected in a street or a predetermined area (e.g., an airport or the like), or the like. In this case, a person captured in an image generated by a security camera installed in a street or the predetermined area becomes a collation-target person.

The "collation information" refers to a camera image or a three-dimensional shape image of a collation-target person. In other words, the acquisition unit 11 may acquire the camera image being an image of the collation-target person generated by a camera. Alternatively, the acquisition unit 11 may acquire the three-dimensional shape image being restored from the camera image and representing a three-dimensional shape of a person. In this case, an external apparatus different from the processing apparatus 10 restores the three-dimensional shape image from the camera image. Alternatively, the acquisition unit 11 may acquire a camera image. Then, the acquisition unit 11 may restore the three-dimensional shape image from the camera image, and thereby acquire the three-dimensional shape image.

The "camera image of a collation-target person" refers to an image being generated by a camera and capturing a collation-target person. The camera image may be a still image, or may be a moving image. The camera image represents a face of the collation-target person and/or a part or entirety of a body of the collation-target person. The camera may be a camera including a sensor that detects visible light. Alternatively, the camera may be a camera including a sensor that detects invisible light (such as infrared light).

The "three-dimensional shape image of a collation-target person" refers to a three-dimensional image that is restored from a camera image being generated by a camera and capturing the collation-target person, and that represents a three-dimensional shape of the person. FIG. 3 illustrates one example of a three-dimensional shape image. As illustrated in FIG. 3, the three-dimensional shape image can represent a three-dimensional shape of a face of a person. Alternatively, although not illustrated in the drawing, the three-dimensional shape image may represent a three-dimensional shape of a body (an upper half of a body, a lower half of a body, and/or the like) of a person. The three-dimensional shape image is an "image designed by a computer" being restored from a camera image, and is not a camera image. A means for restoring the three-dimensional shape image from a camera image is not particularly limited, and any techniques can be adopted as the means.

In the present example embodiment, "acquisition" includes at least one of: "to take out, by an own apparatus, data or information stored in another apparatus or storage medium (active acquisition)"; and "to input, to the own apparatus, data or information output from another apparatus (passive acquisition)". Examples of the active acquisition include: making a request or an inquiry to another apparatus and thereby receiving a reply thereto; accessing another apparatus or storage medium and thereby making reading-out; and the like.

In addition, examples of the passive acquisition include receiving information delivered (or transmitted, or for which push notification is made, for example), and the like. Further, "acquisition" may be selecting and acquiring from received data or information, or selecting and receiving delivered data or information.

For example, the acquisition unit 11 may acquire collation information being input to the processing apparatus 10 by user's operation via an input apparatus included in the processing apparatus 10. Alternatively, the processing apparatus 10 and a camera may be configured in such a way as to be able to communicate with each other. Then, the acquisition unit 11 may acquire collation information transmitted from the camera to the processing apparatus 10. Alternatively, it may be configured in such a way that a camera image generated by a camera is accumulated in a predetermined external apparatus. Then, the acquisition unit 11 may acquire collation information from the external apparatus. Alternatively, the processing apparatus 10 may be a server. Then, the acquisition unit 11 may acquire collation information transmitted to the processing apparatus 10 from a client terminal.

The collation unit 12 collates collation information acquired by the acquisition unit 11, with reference person information registered in advance in a database.

The "reference person information" refers to information concerning each of a plurality of reference persons. The reference person information includes a three-dimensional shape image being restored from a camera image and representing a three-dimensional shape of the person. Definition of the three-dimensional shape image is described above. Note that, the reference person information does not include a camera image of the reference person. In other words, the camera image of the reference person is not registered in the database. Thus, there is no privacy problem caused by registering a camera image of a reference person in the database.

The "reference person" refers to a person registered in advance in a list. The list is a blacklist, a whitelist, a list of persons having legitimate authority (login authority, entrance authority, or the like), or the like. For example, a culprit, a suspect, a witness of an incident, an ex-convict, a dangerous person, a person to which attention needs to be paid, and/or the like are registered in the blacklist. In addition, for example, a person who guards a street and/or a predetermined area (e.g., an airport or the like), a police officer, and/or the like are registered in the whitelist. In addition, a person who has legitimate authority (login authority, entrance authority, or the like) by prior registration or the like is registered in the list of persons having legitimate authority.

The database is generated in advance by any means. For example, a camera image of the reference person is necessary for generating the reference person information and registering the reference person information in the database. A means for acquiring the camera image is not particularly limited.

In one example, when a culprit, a suspect, a witness of an incident, an ex-convict, a dangerous person, a person to which attention needs to be paid, and/or the like are the reference person, camera images of these persons acquired in police investigation may be used. Alternatively, a camera image taken by the police or the like at a time of past arrest may be used. Alternatively, camera images of the persons may be acquired by other means. The camera images are input to the processing unit 10 by any means.

In addition, when a police officer performing guard, a person having legitimate authority (login authority, entrance authority, or the like), and/or the like are the reference persons, camera images of these persons may be acquired from each of the persons, provided that it has been communicated to them that the camera images are not registered in the database. For example, each of the persons performs operation of transmitting his or her own camera image to the processing apparatus 10, by using his or her own terminal apparatus. Then, the processing apparatus 10 acquires camera image transmitted from the terminal apparatus. These pieces of processing can be achieved by using any conventional techniques. The terminal apparatus is a smartphone, a personal computer, a mobile phone, or the like.

Details of collation processing by the collation unit 12 are not particularly limited, and any conventional techniques can be adopted as the collation processing. In other words, the collation unit 12 can perform the collation processing in a manner similar to collation processing used in conventional personal authentication that uses a camera image. In the collation processing used in the conventional personal authentication that uses a camera image, the collation unit 12 uses a three-dimensional shape image as illustrated in FIG. 3, instead of a camera image.

As illustrated in FIG. 3, a three-dimensional shape image represents a feature of an appearance of a person, similarly to a camera image. Thus, various feature values (a position, a shape, and a size of each part, a relative positional relation between or among a plurality of parts, an extracted keypoint, and/or the like) of an appearance of a person can be extracted from a three-dimensional shape image, similarly to a case of a camera image. Thus, the collation unit 12 can perform the collation processing in the manner similar to that in the case of using a camera image.

The output unit 13 executes processing depending on a result of the collation by the collation unit 12. The result of the collation indicates whether there is the reference person information that matches the collation information acquired by the acquisition unit 11.

The processing depending on a result of the collation may be processing of transmitting the result of the collation to a predetermined apparatus. Alternatively, the processing depending on a result of the collation may be different processing. A content of the different processing executed depending on a result of the collation varies depending on a use situation of the processing apparatus 10. Hereinafter, a content of the processing executed depending on a result of the collation will be described, separately for each use situation.

—A Case in which the Processing Apparatus 10 is Used in a Situation of Detecting a Person Registered in the Blacklist—

When there is the reference person information that matches the collation information acquired by the acquisition unit 11, the output unit 13 outputs warning information. The warning information indicates that a reference person registered in the blacklist has been detected. The output of the warning information may be transmission of the warning information to a predetermined terminal apparatus. Alternatively, the output of the warning information may be displaying of the warning information on a predetermined display. Alternatively, the output of the warning information may include at least one of lighting or flashing of a warning lamp, an output of a warning sound via a speaker, and vibrating of a vibrator.

The warning information transmitted to the predetermined terminal apparatus and the warning information displayed on the predetermined display may include the collation information acquired by the acquisition unit 11 and the reference person information that matches the collation information. As described above, the collation information includes a camera image being an image of a collation-target person generated by a camera, or a three-dimensional shape image being restored from the camera image and representing a three-dimensional shape of the person. The reference person information includes a three-dimensional shape image being restored from a camera image and representing a three-dimensional shape of the reference person. A person who receives such warning information compares the collation information and the reference person information to each other, and can thereby decide validity of personal authentication by a computer.

In addition, a person who receives the warning information including the reference person information can search for the reference person while referring to the three-dimensional shape image being included in the reference person information and representing the three-dimensional shape of the reference person.

—A Case in which the Processing Apparatus 10 is Used in a Situation of Detecting a Person Registered in the Whitelist—

When there is the reference person information that matches the collation information acquired by the acquisition unit 11, the output unit 13 outputs notification information. The notification information indicates that a reference person registered in the whitelist has been detected. The output of the notification information may be transmission of the notification information to a predetermined terminal apparatus. Alternatively, the output of the notification information may be displaying of the notification information on a predetermined display. Alternatively, the output of the notification information may include at least one of lighting or flashing of a notification lamp, an output of a notification sound via a speaker, and vibrating of a vibrator.

The notification information transmitted to the predetermined terminal apparatus and the notification information displayed on the predetermined display may include the collation information acquired by the acquisition unit 11 and the reference person information that matches the collation information. A person who receives such notification information compares the collation information and the reference person information to each other, and can thereby decide validity of personal authentication by a computer.

In addition, a person who receives the notification information including the reference person information can search for the reference person while referring to a three-dimensional shape image being included in the reference person information and representing a three-dimensional shape of a reference person.

—A Case in which the Processing Apparatus 10 is Used in a Situation of Detecting a Person Registered in the List of Persons Having Legitimate Authority (Login Authority, Entrance Authority, or the Like)—

When there is the reference person information that matches the collation information acquired by the acquisition unit 11, the output unit 13 executes predetermined processing being performed for a person having the legitimate authority. The predetermined processing depends on a content of the legitimate authority. When the legitimate authority is login authority, the predetermined processing may be, for example, processing of permitting login, generating a screen (my page or the like) after the login, and then transmitting the generated screen to a terminal apparatus of a user. Alternatively, when the legitimate authority is entrance authority, the predetermined processing may be, for example, processing of inputting a command signal for opening a gate, to an apparatus that controls opening and closing of the gate.

On the other hand, when there is not the reference person information that matches the collation information acquired by the acquisition unit 11, the output unit 13 may output error information notifying that personal authentication has failed. The output of the error information may be transmission of the error information to a predetermined terminal apparatus. Alternatively, the output of the error information may be displaying of the error information on a predetermined display. Alternatively, the output of the error information may include at least one of lighting or flashing of a notification lamp, an output of an error sound via a speaker, and vibrating of a vibrator.

Figure 4:
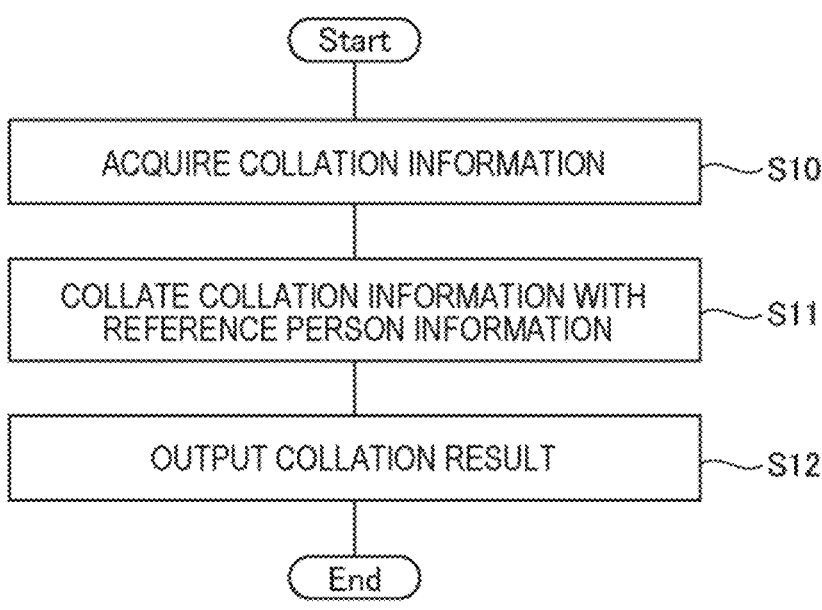
FIG. 4 is a flowchart illustrating one example of a flow of processing of the processing apparatus.

Next, one example of a flow of processing of the processing apparatus 10 will be described with reference to a flowchart in FIG. 4.

First, the processing apparatus 10 acquires collation information including a camera image being an image of a collation-target person generated by a camera, or a three-dimensional shape image being restored from the camera image and representing a three-dimensional shape of the person (S10). For example, the processing apparatus 10 may acquire a camera image being an image of the collation-target person generated by a camera. Alternatively, the processing apparatus 10 may acquire a three-dimensional shape image being restored from the camera image and representing a three-dimensional shape of the person. Alternatively, the processing apparatus 10 may acquire a camera image, and restore a three-dimensional shape image from the camera image.

Next, the processing apparatus 10 collates collation information acquired in S10, with reference person information of each of a plurality of reference persons registered in advance in the database (S11). The reference person information includes a three-dimensional shape image being restored from a camera image and representing a three-dimensional shape of each of a plurality of the reference persons. For example, the processing apparatus 10 may perform the collation by using the acquired camera image (collation information) and the three-dimensional shape image (reference person information). Alternatively, the processing apparatus 10 may perform the collation by using the acquired three-dimensional shape image (collation information) and the three-dimensional shape image (reference person information). Alternatively, the processing apparatus 10 may perform the collation by using a three-dimensional shape image being restored from the acquired camera image (collation information) and the three-dimensional shape image (reference person information).

Then, the processing apparatus 10 executes processing depending on a result of the collation of S11 (S12).

"Advantageous Effect"

The processing apparatus 10 according to the present example embodiment achieves an advantageous effect similar to that in the first example embodiment.

Further, when collation information matches reference person information, the processing apparatus 10 can output the collation information, and the reference person information that matches the collation information. A person who receives this information compares the collation information and the reference person information to each other, and can thereby decide validity of personal authentication by a computer.

In addition, a person who receives the reference person information can search for a reference person while referring to a three-dimensional shape image being included in the reference person information and representing a three-dimensional shape of the reference person.

Third Example Embodiment

In the present example embodiment, personal authentication is performed by using different information in addition to a three-dimensional shape image of a reference person. The different information is information different from a camera image. Thereby, accuracy of personal authentication is improved. Hereinafter, details thereof will be described.

As illustrated in FIG. 5, the reference person information registered in advance in a database includes the different information in addition to the three-dimensional shape image. In addition, although not illustrated in the drawing, "collation information concerning a collation-target person" acquired by an acquisition unit 11 also includes the different information.

The different information is information different from a camera image. For example, the different information includes at least one of a feature value of a gait of a person, a feature value of a physique of a person, a feature value of a face of a person, a feature value of an iris of a person, a feature value of a voiceprint of a person, and an otoacoustic feature value of a person.

The feature value of a gait of a person concerns at least one of a motion manner of four limbs in a fixed distance, trajectories of a joint and a head, a stride length, and velocity.

The "motion manner of four limbs in a fixed distance" refers to a feature of a manner in which a person moves the four limbs while moving the fixed distance. The feature of the motion manner of the four limbs may be represented by movement trajectories of feature points of the four limbs, for example. The feature points of the four limbs may be joint portions of the four limbs, distal ends of the four limbs, or other parts of the four limbs. The movement trajectories of the feature points of the four limbs may be represented in a three-dimensional space. Alternatively, the movement trajectories of the feature points of the four limbs may represent trajectories of changes (up-down changes) in heights (heights from the ground) of the feature points. Alternatively, the movement trajectories of the feature points of the four limbs may be time changes in relative positions with respect to a reference point in a body. The reference point is a head portion, a waist portion, or the like, but is not limited thereto.

The "trajectories of a joint and a head" may be represented in a three-dimensional space. Alternatively, the trajectories of the joint and the head may represent trajectories of changes (up-down changes) in heights (heights from the ground) of the joint and the head. Alternatively, the trajectories of the joint and the head may be time changes in relative positions with respect to a reference point in a body. The reference point is a head portion, a waist portion, or the like, but is not limited thereto.

The feature value of the gait of a person as described above can be computed based on a moving image generated by a camera. For example, using a technique such as OpenPose enables extraction of a joint point of a person in an image. Movement trajectories of the joint points in the moving image are acquired, and thereby, a feature value of the gait of the person as described above is computed.

The "stride length", "velocity", "a feature value of a physique of a person", "a feature value of a face of a person", "a feature value of an iris of a person", "a feature value of a voiceprint of a person", and "an otoacoustic feature value of a person" are widely known, and thus, description thereof is omitted herein. Computation of these feature values can be achieved by using any conventional techniques.

A collation unit 12 performs collation based on the above-described different information, in addition to collation based on the three-dimensional shape image. The collation based on the different information includes at least one of collation between feature values of a gait, collation between feature values of a physique, collation between feature values of a face, collation between feature values of an iris, collation between feature values of a voiceprint, and collation between otoacoustic feature values. Then, the collation unit 12 integrates a plurality of results of these pieces of collation, and thus computes a result of the collation.

There are various manners of the integrating, and any techniques can be adopted for the integrating. For example, the collation unit 12 computes a similarity degree by the collation between each type of features, then integrates the similarity degrees, and thus computes an integrated similarity degree. Then, when the integrated similarity degree is equal to or more than a reference value, the collation unit 12 can decide that the collation information matches the reference person information.

The integrated similarity degree may be computed by inputting, to a predetermined arithmetic formula, a similarity degree computed by the collation between each type of features. The arithmetic formula may be a formula of summing a similarity degree computed by the collation between each type of features. Alternatively, the arithmetic formula may be a formula of summing a value acquired by multiplying, with a weight depending on each type of features, a similarity degree computed by the collation between each type of features. Alternatively, the integrated similarity degree may be a statistical value (an average value, a weighted average value, a maximum value, a minimum value, a median, a mode, or the like) of a similarity degree computed by the collation between each type of features.

The other configurations of the processing apparatus 10 according to the present example embodiment are similar to those of the first and second example embodiments.

According to the processing apparatus 10 of the present example embodiment, an advantageous effect similar to that in the first and second example embodiments is achieved. Further, the processing apparatus 10 according to the present example embodiment performs personal authentication by using the different information in addition to a three-dimensional shape image of a reference person. The different information is information different from a camera image. For example, the different information includes at least one of a feature value of a gait of a person, a feature value of a physique of a person, a feature value of a face of a person, a feature value of an iris of a person, a feature value of a voiceprint of a person, and an otoacoustic feature value of a person.

Also in a case of using such different information, a camera image does not need to be registered in advance in the database. Thus, a problem of performing personal authentication using an image without registering a camera image is solved. In addition, accuracy in personal authentication is improved by using the different information as described above in addition to the three-dimensional shape image.

Particularly, accuracy in personal authentication is improved by using a feature value of person's featuring gait being a motion manner of four limbs in a fixed distance.

In addition, by using a feature value, such as a feature value of a voiceprint of a person and an otoacoustic feature value of a person, acquired from a source other than an image generated by a camera, personal authentication can be performed with high accuracy even when a clear camera image cannot be acquired. A case in which a clear camera image cannot be acquired is a case of night or the like.

Fourth Example Embodiment

Figure 6:
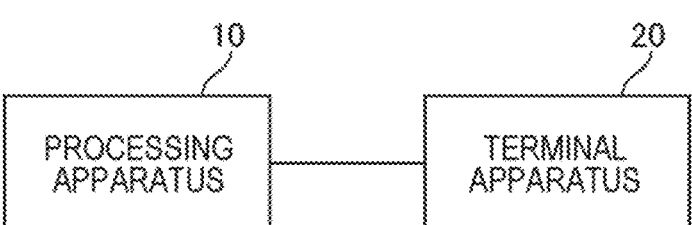
FIG. 6 is a diagram illustrating one example of a functional block diagram of a processing system.

A processing system 1 according to the present example embodiment includes a processing apparatus 10 and a terminal apparatus 20, as illustrated in FIG. 6.

A configuration of the processing apparatus 10 is similar to that in the first to third example embodiments.

Figure 7:
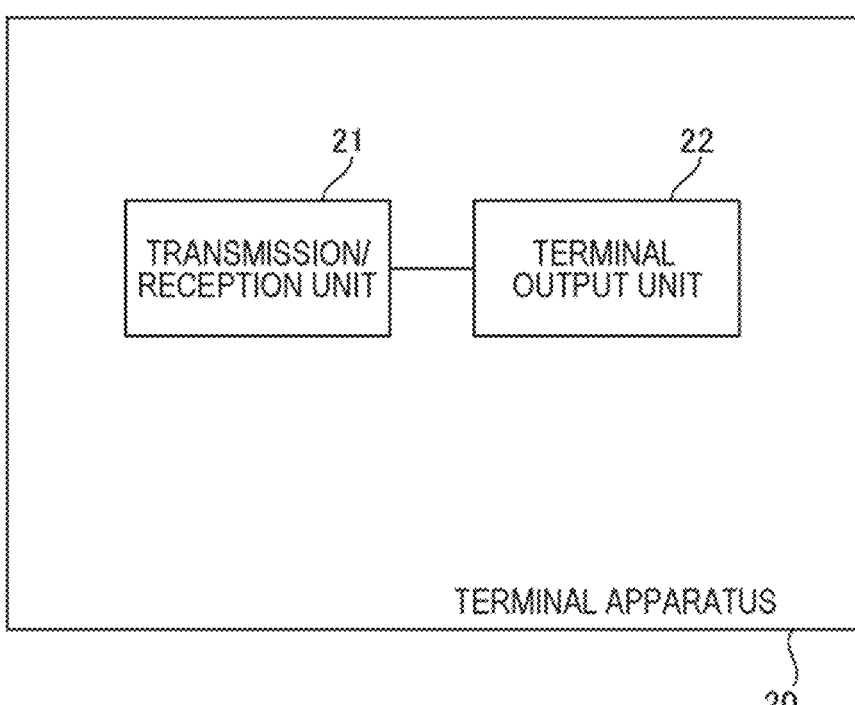
FIG. 7 is a diagram illustrating one example of a functional block diagram of a terminal apparatus.

FIG. 7 illustrates one example of a functional block diagram of the terminal apparatus 20. As illustrated in the drawing, the terminal apparatus 20 includes a transmission/reception unit 21 and a terminal output unit 22.

The transmission/reception unit 21 transmits collation information to the processing apparatus 10. Then, the transmission/reception unit 21 receives, from the processing apparatus 10, reference person information that matches the collation information.

The terminal output unit 22 outputs the received reference person information. The terminal output unit 22 can achieve the output via any output apparatuses such as a display, a projection apparatus, and a printer.

The terminal apparatus 20 may be a smartphone, a tablet terminal, a personal computer, a smart watch, a mobile phone, or the like. In this case, for example, a user of the terminal apparatus 20 operates the terminal apparatus 20, and thereby log in the processing apparatus 10.

Then, the user perform, on the terminal apparatus 20, operation for transmitting the collation information, receiving the reference person information, and outputting the reference person information.

Alternatively, the terminal apparatus 20 may be a dedicated apparatus that executes the above-described processing in cooperation with the processing apparatus 10. In this case, the terminal apparatus 20 is installed at a place where personal authentication is required. Examples of such a place include a store that requires personal authentication for purchase of a product, a facility that requires personal authentication for entrance, and the like.

Figure 8:
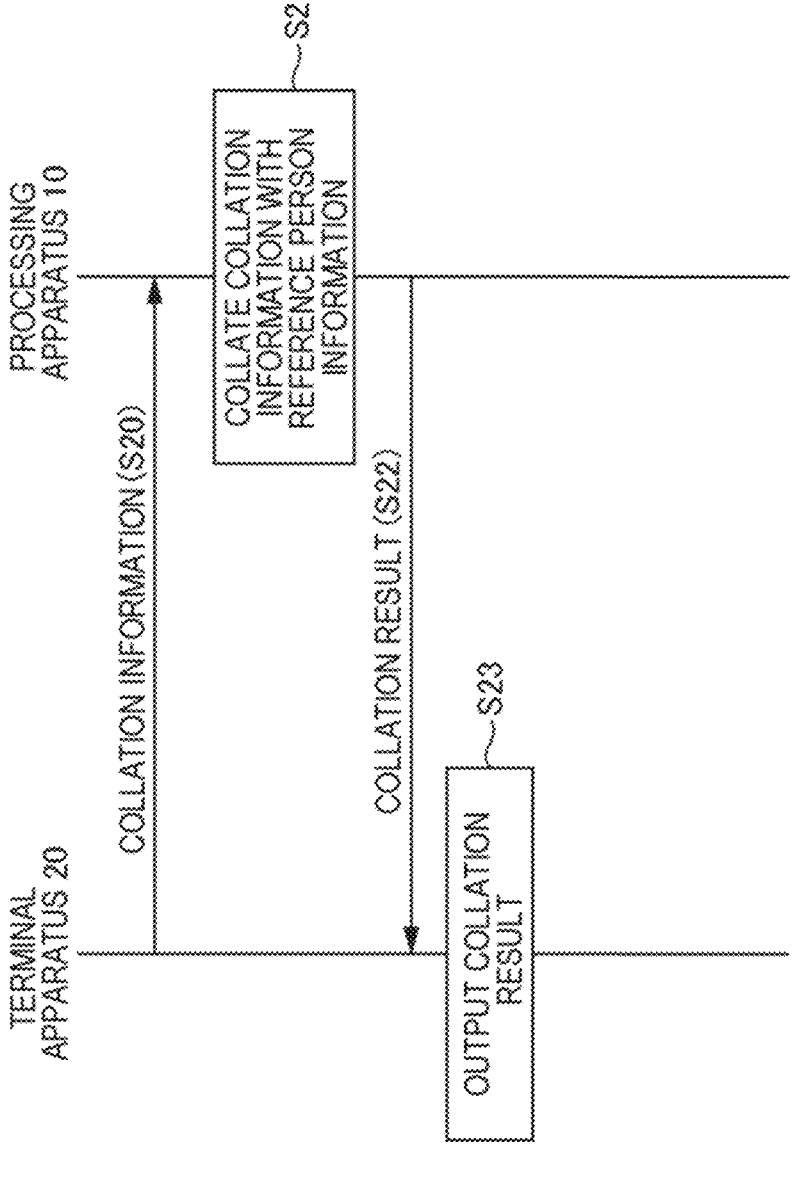
FIG. 8 is a sequence diagram illustrating one example of a flow of processing of the processing system.

Next, one example of a flow of processing of the processing system 1 will be described with reference to a sequence diagram in FIG. 8.

First, the terminal apparatus 20 transmits collation information to the processing apparatus 10 (S20). The collation information includes a camera image being an image of a collation-target person generated by a camera, or a three-dimensional shape image being restored from a camera image and representing a three-dimensional shape of the person. For example, the terminal apparatus 20 may restore the three-dimensional shape image from the camera image.

Next, the processing apparatus 10 collates the collation information acquired in S20, with reference person information registered in advance in a database (S21). The reference person information is information concerning each of a plurality of reference persons. The reference person information includes a three-dimensional shape image being restored from a camera image and representing a three-dimensional shape of the person.

Note that, as described in the third example embodiment, the collation information and the reference person information may include different information. Then, the processing apparatus 10 may perform the collation in S21 by additionally using the different information.

Then, the processing apparatus 10 transmits a result of the collation to the terminal apparatus 20 (S22). The result of the collation indicates whether there is the reference person information that matches the collation information acquired by the acquisition unit 11. Then, the terminal apparatus 20 outputs the received result of the collation (S23).

Note that, in S22, information depending on a use situation of the processing system 1 may be transmitted from the processing apparatus 10 to the terminal apparatus 20. Then, in S23, the terminal apparatus 20 may execute a predetermined processing based on the information depending on the use situation.

One example of the use situation is "a situation of detecting a person registered in a blacklist". In this case, when there is the reference person information that matches the collation information acquired in S20, the processing apparatus 10 can transmit warning information to the terminal apparatus 20. Then, the terminal apparatus 20 can output the warning information. Details of the warning information are described in the second example embodiment.

Another example of the use situation is "a situation of detecting a person registered in a whitelist". In this case, when there is the reference person information that matches the collation information acquired in S20, the processing apparatus 10 can transmit notification information to the terminal apparatus 20. Then, the terminal apparatus 20 can output the notification information. Details of the notification information are described in the second example embodiment.

Still another example of the use situation is "a situation of detecting a person registered in a list of persons having legitimate authority (login authority, entrance authority, or the like)". In this case, when there is the reference person information that matches the collation information acquired in S20, the processing apparatus 10 may generate a screen (my page or the like) after login and transmit the generated screen to the terminal apparatus 20. Then, the terminal apparatus 20 outputs the screen. Alternatively, when there is the reference person information that matches the collation information acquired in S20, the processing apparatus 10 may transmit a command signal for opening a gate, to the terminal apparatus 20 that controls opening and closing of the gate. Then, the terminal apparatus 20 performs processing of opening the gate, based on the command signal. On the other hand, when there is not the reference person information that matches the collation information acquired in S20, the processing apparatus 10 may transmit, to the terminal apparatus 20, error information notifying that the personal authentication has failed. Then, the terminal apparatus 20 outputs the error information.

Next, one example of a hardware configuration of the terminal apparatus 20 will be described. Each function unit of the terminal apparatus 20 is achieved by any combination of hardware and software. It is understood by those skilled in the art that there are various modifications for an achieving method thereof. Examples of the software include a program stored in advance at a stage of shipping an apparatus, a program downloaded from a storage medium such as a compact disc (CD), a server on the Internet, or the like, and the like. FIG. 2 is a block diagram illustrating the hardware configuration of the terminal apparatus 20. FIG. 2 is described in the second example embodiment, and thus, description thereof is omitted herein.

According to the processing system 1, the processing apparatus 10, and the terminal apparatus 20 of the present example embodiment, an advantageous effect similar to that in the first to third example embodiments is achieved.

EXAMPLE

Example 1

In an example 1, a processing system 1 is used for collating a person in a street with a blacklist.

First, reference person information of a culprit, a suspect, a reference person of an incident, an ex-convict, a dangerous person, a person to which attention needs to be paid, and/or the like is registered in the blacklist.

The processing apparatus 10 acquires, as collation information, a camera image generated by a surveillance camera installed in a street, a camera image generated by a drive recorder, a camera image generated by a camera worn by a predetermined person (e.g., a police officer), and the like. The surveillance camera installed in a street includes a surveillance camera installed in a road, a surveillance camera installed in a facility such as a station and an airport, a surveillance camera installed in a constructed structure such as a building, and the like. A person in a street is captured in these camera images.

Then, the processing apparatus 10 collates the collation information with the reference person information. When the collation information and the reference person information match each other, the processing apparatus 10 outputs warning information. Details of the warning information are described in the second example embodiment. In addition, the processing apparatus 10 may output position information of the matched collation information. The position information is an image capturing position of a camera image included in the collation information. For example, the position information may be included in metadata of the camera image. Alternatively, the processing apparatus 10 may determine an image capturing position of a camera image by analyzing the camera image and detecting a landmark specific to each position in the camera image.

Examples of an output destination of the above-described information include a system of the police, a terminal apparatus held by a police officer, and the like.

Example 2

In an example 2, the processing system 1 is used for collating, with a blacklist, a person who visits a store and tries to purchase a predetermined product.

The predetermined product is a product whose sale to a person registered in the blacklist is restricted. An example thereof is a dangerous article such as a gun and a knife.

In this example, for example, reference person information of a culprit, a suspect, a reference person of an incident, an ex-convict, a dangerous person, a person to which attention needs to be paid, and/or the like is registered in the blacklist.

The processing apparatus 10 acquires, as collation information, a camera image generated by a camera installed in a store that handles the predetermined product, or a camera image captured with any camera by a clerk of the store. A person who tries to purchase the predetermined product is captured in these camera images.

Then, the processing apparatus 10 collates the collation information with the reference person information. When the collation information and the reference person information match each other, the processing apparatus 10 outputs warning information. Details of the warning information are described in the second example embodiment.

An output destination of the above-described warning information is the terminal apparatus 20 that has transmitted the collation information. Alternatively, the processing apparatus 10 may transmit the warning information to a system of the police or the like.

Example 3

In an example 3, the processing system 1 is used for collating a person who appears in a predetermined place at night, with a blacklist generated based on a camera image captured during the daytime.

In this example, for example, reference person information of a culprit, a suspect, a reference person of an incident, an ex-convict, a dangerous person, a person to which attention needs to be paid, and/or the like is registered in the blacklist. Specifically, a three-dimensional shape image and at least a part of different information described in the third example embodiment are generated based on camera an image captured during the daytime, and are registered as the reference person information in the blacklist. The different information includes a feature value of a gait of a person.

The processing apparatus 10 acquires, as collation information, a camera image generated at night by a surveillance camera installed in a street, a camera image generated at night by a drive recorder, a camera image generated at night by a camera worn by a predetermined person (e.g., a police officer), and the like. The surveillance camera installed in a street includes a surveillance camera installed in a road, a surveillance camera installed in a facility such as a station and an airport, a surveillance camera installed in a constructed structure such as a building, and the like. A persons in a street is captured in these camera images. The camera image is a camera image generated by an infrared camera.

Then, the processing apparatus 10 collates the collation information with the reference person information, based on a three-dimensional shape image and the different information described in the third example embodiment. For example, the processing apparatus 10 may perform collation by using a feature value of a gait of a person.

When the collation information and the reference person information match each other, the processing apparatus 10 outputs warning information. Details of the warning information are described in the second example embodiment. In addition, the processing apparatus 10 may output position information of the matched collation information. The position information is an image capturing position of a camera image included in the collation information. For example, the position information may be included in metadata of the camera image. Alternatively, the processing apparatus 10 may determine an image capturing position of a camera image by analyzing the camera image and detecting a landmark specific to each position in the camera image.

Examples of an output destination of the above-described information include a system of the police, a terminal apparatus held by a police officer, and the like.

Modified Example

A processing apparatus 10 may perform personal authentication without using a camera image and an image being restored from a camera image and representing a three-dimensional shape of a person. Specifically, the processing apparatus 10 may perform personal authentication by using at least one of a feature value of a gait of a person, a feature value of a physique of a person, a feature value of a face of a person, a feature value of an iris of a person, a feature value of a voiceprint of a person, and an otoacoustic feature value of a person. Details of these feature values are described in the third example embodiment. Also in the modified example, personal authentication can be performed without registering a camera image.

Although the example embodiments of the present invention are described above with reference to the drawings, these are exemplifications of the present invention, and various configurations other than those described above can also be adopted. The configurations of the above-described example embodiments may be combined with each other, or a part of the configurations may be replaced with another or others of the configurations. In addition, the configurations of the above-described example embodiments may be variously modified within a range that does not depart from the essence of the present invention. Further, the configurations and pieces of the processing disclosed in the above-described example embodiments and modified example may be combined with each other.

In addition, in a plurality of the flowcharts used in the above description, a plurality of the steps (pieces of processing) are described in order. However the execution order of the steps executed in each example embodiment is not limited to the described order. In each example embodiment, the order of the illustrated steps can be changed within a range in which inconvenience does not occur in the content. The above-described each example embodiment can be combined within a range in which contradiction does not occur in the content.

A part or all of the above-described example embodiments can also be described as in the following supplementary notes, but there is no limitation to the following.

1. A processing apparatus including:
    an acquisition unit that acquires collation information including a camera image being an image of a collation-target person generated by a camera, or an image being restored from the camera image and representing a three-dimensional shape of a person;
    a collation unit that collates the collation information with reference person information including an image being restored from a camera image and representing a three-dimensional shape of each of a plurality of reference persons; and
    an output unit that executes processing depending on a result of the collation.
2. The processing apparatus according to supplementary note 1, wherein,
    when the collation information and the reference person information match each other, the output unit outputs an image being included in the matched reference person information and representing a three-dimensional shape of the reference person.
3. The processing apparatus according to supplementary note 1 or 2, wherein
    an image representing the three-dimensional shape represents a three-dimensional shape of a face of a person.
4. The processing apparatus according to any one of supplementary notes 1 to 3, wherein
    an image representing the three-dimensional shape represents a three-dimensional shape of a body of a person.
5. The processing apparatus according to any one of supplementary notes 1 to 4, wherein
    the reference person information and the collation information further include at least one of a feature value of a gait of a person, a feature value of a physique of a person, a feature value of a face of a person, a feature value of an iris of a person, a feature value of a voiceprint of a person, and an otoacoustic feature value of a person.

6. The processing apparatus according to supplementary note 5, wherein
    a feature value of a gait of the person concerns at least one of a motion manner of four limbs in a fixed distance, trajectories of a joint and a head, a stride length, and velocity.
7. The processing apparatus according to any one of supplementary notes 1 to 6, wherein
    the reference person information does not include an image of the reference person generated by a camera.
8. A processing system including:
    a processing apparatus includes
        an acquisition unit that acquires collation information including a camera image being an image of a collation-target person generated by a camera, or an image being restored from the camera image and representing a three-dimensional shape of a person,
        a collation unit that collates the collation information with reference person information including an image being restored from a camera image and representing a three-dimensional shape of each of a plurality of reference persons, and
        an output unit that outputs the reference person information matching the collation information; and
    a terminal apparatus includes
        a transmission/reception unit that transmits the collation information to the processing apparatus, and receives, from the processing apparatus, the reference person information matching the collation information, and
        a terminal output unit that outputs the received reference person information.
9. A processing method including,
    by at least one computer:
        acquiring collation information including a camera image being an image of a collation-target person generated by a camera, or an image being restored from the camera image and representing a three-dimensional shape of a person;
        collating the collation information with reference person information including an image being restored from a camera image and representing a three-dimensional shape of each of a plurality of reference persons; and
        executing processing depending on a result of the collation.
10. A program causing a computer to function as:
    an acquisition unit that acquires collation information including a camera image being an image of a collation-target person generated by a camera, or an image being restored from the camera image and representing a three-dimensional shape of a person;
    a collation unit that collates the collation information with reference person information including an image being restored from a camera image and representing a three-dimensional shape of each of a plurality of reference persons; and
    an output unit that executes processing depending on a result of the collation.
1 Processing system
10 Processing apparatus
11 Acquisition unit
12 Collation unit
13 Output unit
20 Terminal apparatus 21 Transmission/reception unit
22 Terminal output unit
1A Processor
2A Memory
3A Input/output I/F
4A Peripheral circuit
5A Bus

The invention claimed is:

1. A processing apparatus comprising:
at least one memory configured to store one or more instructions; and
at least one processor configured to execute the one or more instructions to:
acquire collation information including a camera image being an image of a collation-target person generated by a camera, or an image being restored from the camera image and representing a three-dimensional shape of a person;
collate the collation information with reference person information including an image being restored from a camera image and representing a three-dimensional shape of each of a plurality of reference persons; and
execute processing depending on a result of the collation, wherein
the image being restored from the camera image and representing a three-dimensional shape of each of the plurality of reference persons is registered in advance in a database for personal authentication, and
the camera image of each of the plurality of reference persons is not registered in the database.

2. The processing apparatus according to claim 1, wherein the processor is further configured to execute the one or more instructions to
when the collation information and the reference person information match each other, output an image being included in the matched reference person information and representing a three-dimensional shape of the reference person.

3. The processing apparatus according to claim 2, wherein an image representing the three-dimensional shape represents a three-dimensional shape of a face of a person.

4. The processing apparatus according to claim 3, wherein an image representing the three-dimensional shape represents a three-dimensional shape of a body of a person.

5. The processing apparatus according to claim 2, wherein the reference person information and the collation information further include at least one of a feature value of a gait of a person, a feature value of a physique of a person, a feature value of a face of a person, a feature value of an iris of a person, a feature value of a voiceprint of a person, and an otoacoustic feature value of a person.

6. The processing apparatus according to claim 5, wherein a feature value of a gait of the person concerns at least one of a motion manner of four limbs in a fixed distance, trajectories of a joint and a head, a stride length, and velocity.

7. The processing apparatus according to claim 2, wherein the reference person information does not include an image of the reference person generated by a camera.

8. A processing method comprising, by at least one computer:
acquiring collation information including a camera image being an image of a collation-target person generated by a camera, or an image being restored from the camera image and representing a three-dimensional shape of a person;
collating the collation information with reference person information including an image being restored from a camera image and representing a three-dimensional shape of each of a plurality of reference persons; and
executing processing depending on a result of the collation, wherein
the image being restored from the camera image and representing a three-dimensional shape of each of the plurality of reference persons is registered in advance in a database for personal authentication, and
the camera image of each of the plurality of reference persons is not registered in the database.

9. The processing method according to claim 8, wherein the at least one computer
when the collation information and the reference person information match each other, outputs an image being included in the matched reference person information and representing a three-dimensional shape of the reference person.

10. The processing method according to claim 9, wherein an image representing the three-dimensional shape represents a three-dimensional shape of a face of a person.

11. The processing method according to claim 10, wherein an image representing the three-dimensional shape represents a three-dimensional shape of a body of a person.

12. The processing method according to claim 9, wherein the reference person information and the collation information further include at least one of a feature value of a gait of a person, a feature value of a physique of a person, a feature value of a face of a person, a feature value of an iris of a person, a feature value of a voiceprint of a person, and an otoacoustic feature value of a person.

13. The processing method according to claim 12, wherein a feature value of a gait of the person concerns at least one of a motion manner of four limbs in a fixed distance, trajectories of a joint and a head, a stride length, and velocity.

14. A non-transitory storage medium storing a program causing a computer to:
acquire collation information including a camera image being an image of a collation-target person generated by a camera, or an image being restored from the camera image and representing a three-dimensional shape of a person;
collate the collation information with reference person information including an image being restored from a camera image and representing a three-dimensional shape of each of a plurality of reference persons; and
execute processing depending on a result of the collation, wherein
the image being restored from the camera image and representing a three-dimensional shape of each of the plurality of reference persons is registered in advance in a database for personal authentication, and
the camera image of each of the plurality of reference persons is not registered in the database.

15. The non-transitory storage medium according to claim 14, wherein the program causing the computer to when the collation information and the reference person information match each other, output an image being included in the matched reference person information and representing a three-dimensional shape of the reference person.

16. The non-transitory storage medium according to claim 15, wherein an image representing the three-dimensional shape represents a three-dimensional shape of a face of a person.

17. The non-transitory storage medium according to claim 16, wherein an image representing the three-dimensional shape represents a three-dimensional shape of a body of a person.

18. The non-transitory storage medium according to claim 15, wherein the reference person information and the collation information further include at least one of a feature value of a gait of a person, a feature value of a physique of a person, a feature value of a face of a person, a feature value of an iris of a person, a feature value of a voiceprint of a person, and an otoacoustic feature value of a person.

19. The non-transitory storage medium according to claim 18, wherein a feature value of a gait of the person concerns at least one of a motion manner of four limbs in a fixed distance, trajectories of a joint and a head, a stride length, and velocity.

\* \* \* \* \*